United States Patent [19]
Weimar

[11] 4,432,166
[45] Feb. 21, 1984

[54] TRIMMING OR SEALING STRIPS

[75] Inventor: Erich Weimar, Viersen, Fed. Rep. of Germany

[73] Assignee: Draftex Development AG, Zug, Switzerland

[21] Appl. No.: 324,778

[22] Filed: Nov. 24, 1981

[30] Foreign Application Priority Data

Nov. 29, 1980 [GB] United Kingdom ............... 8038398

[51] Int. Cl.³ .............................................. E06B 7/16
[52] U.S. Cl. .................................... 49/491; 49/497; 52/716; 52/717; 428/31; 428/122; 428/358
[58] Field of Search .................. 428/31, 122, 83, 358; 52/716, 717; 49/490, 491, 497

[56] References Cited

U.S. PATENT DOCUMENTS

| | | | |
|---|---|---|---|
| 3,167,856 | 2/1965 | Zoller | 29/413 |
| 3,467,423 | 9/1969 | Schlegel, Jr. et al. | 403/270 |
| 3,717,955 | 2/1973 | Urbanick | 49/488 |
| 4,010,573 | 3/1977 | Andrzejewski | 49/479 |
| 4,245,450 | 1/1981 | Narita | 52/716 |

FOREIGN PATENT DOCUMENTS

| | | |
|---|---|---|
| 830748 | 3/1960 | United Kingdom ............... 49/491 |
| 942698 | 11/1963 | United Kingdom . |
| 1014387 | 12/1965 | United Kingdom . |
| 1015998 | 1/1966 | United Kingdom . |
| 1095178 | 12/1967 | United Kingdom . |
| 1103963 | 2/1968 | United Kingdom . |
| 1327319 | 8/1973 | United Kingdom . |
| 1330974 | 9/1973 | United Kingdom . |
| 1579727 | 8/1977 | United Kingdom . |

Primary Examiner—Alexander S. Thomas
Attorney, Agent, or Firm—Leydig, Voit, Osann, Mayer & Holt, Ltd.

[57] ABSTRACT

A channel-shaped sealing strip for vehicle door openings, for example, is shown. It has a gripping section incorporating a metal carrier covered in flexible covering material which additionally defines longitudinally extending gripping lips. The sealing strip is formed into a loop, ring or frame to suit a particular vehicle door opening. Along those lengths of the loop intended to be fitted to the portions of the door opening between the latter's sharp bends or corners, the gripping section is provided with additional reinforcing members which seat in the base of the channel. The reinforcing members are made of stiff metal but which can be bent slightly, when the sealing strip is fitted into position, so as to hold the sealing strip in a slight curve, in any plane, to match the door shape. At the positions in the loop where sharp bends or corners are required, the sealing strip is completely free of the reinforcing members.

7 Claims, 3 Drawing Figures

TRIMMING OR SEALING STRIPS

BACKGROUND OF THE INVENTION

The invention relates to channel-shaped strips such as for trimming an edge flange and for sealing purposes. Such strips may, for example, be used in motor vehicles body constructions for trimming edge flanges running around door openings, and luggage compartment openings, and for supporting seals therearound against which a door of the opening closes.

BRIEF SUMMARY OF THE INVENTION

According to the invention, there is provided a channel-shaped trimming or sealing strip in combination with a separate, relatively straight, reinforcing member which is fitted within the channel and which is stiff but sufficiently pliable to enable it to be bent slightly, with the strip, to hold the strip in a slight curve.

According to the invention, there is also provided a channel-shaped trimming or sealing strip in the form of a loop which is pre-formed to suit a particular vehicle body opening, comprising a plurality of lengths of reinforcing member respectively positioned within the channel in parts of the length of the strip between the positions where sharp bends or corners are required in the loop, the lengths of reinforcing member being stiff but sufficiently pliable to enable them to be bent slightly, with the strip, to hold the said parts of the strip in a slight curve, the strip being completely free of said reinforcing member at each of the sharp bends or curves.

DESCRIPTION OF THE DRAWINGS

Trimming and sealing strips embodying the invention will now be described by way of example and with reference to the accompanying diagrammatic drawings in which.

DESCRIPTION OF PREFERRED EMBODIMENTS

The strip shown in the Figures is for fitting to an edge flange around the door opening of a motor vehicle body. It is in the form of a channel-shaped gripping portion 5 including a metal carrier 6 which has a plastics, rubber or similar flexible covering 12 defining inwardly projecting lips 14.

Figure 3:
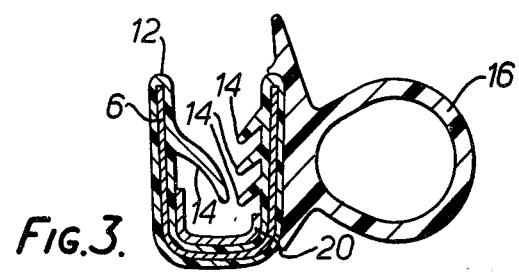
FIG. 3 is a cross-section on the line III—III of FIG. 1 but additionally showing an attached sealing section.

A sealing portion 16 (shown in FIG. 3 only), made of cellular rubber for example, may be attached to the gripping portion 5. In use, the gripping portion 5 grips onto an edge flange around the door opening and supports the sealing section 16 so that the latter extends around the door opening and provides a draught and weatherproof seal onto which the door closes in use. In the absence of the sealing portion 16, the gripping portion 5 performs primarily a trimming or protective function.

The lips 14 form seals against the sides of the flange and also help retention of the gripping portion of the flange. There may be equal numbers of lips 14 on each side of the channel, and the lips can be of the same size.

The sealing portion 16 may be adhesively secured to the plastics covering 12. Instead, however, it is possible to make the covering 12 and the sealing portion 16 of such compatible material that they can be extruded by means of a dual extruding process, so as to have the desired different hardnesses.

The carrier 6 may take any suitable form. For example, it may consist of U-shaped elements arranged side-by-side to define a channel and either completely disconnected from each other or interconnected. Advantageously however, it may take the form shown in British Pat. No. 1,492,061, in British Pat. No. 1,598,683, or in published British Patent Application No. 2,032,500. These each show a carrier where the U-shaped elements are connected together by inclined links which give the carrier longitudinal dimensional stability so as to enable it to resist stretching or shrinkage, but yet enable the carrier, and thus the strip, to be compressed lengthwise to a slight extent.

The strip is advantageously made up into a loop or ring to suit a particular vehicle door opening. Such a door opening will of course have sharp bends or corners with relatively straight portions extending between them. However, with modern vehicle bodies it is unlikely that the relatively straight portions are in fact absolutely straight: they will normally be slightly curved and may be curved in more than the plane. Such portions are referred to below as "intermediate portions".

Figure 1:
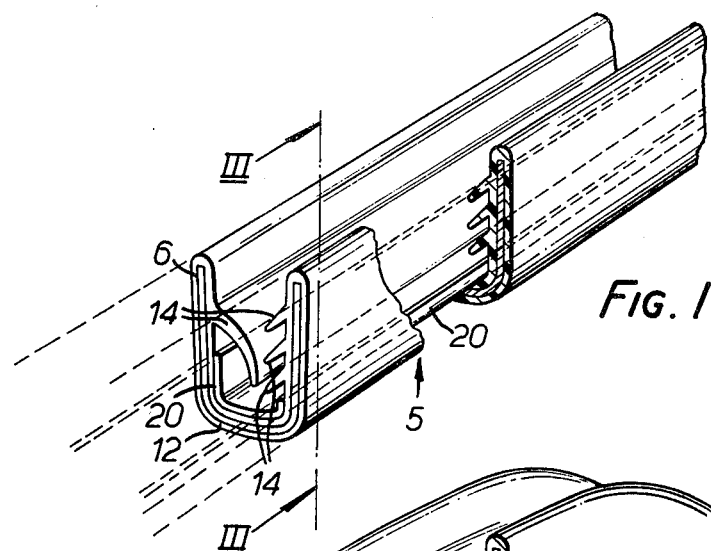
FIG. 1 is a perspective view, partly broken away, of part of one of the strips.
Figure 2:
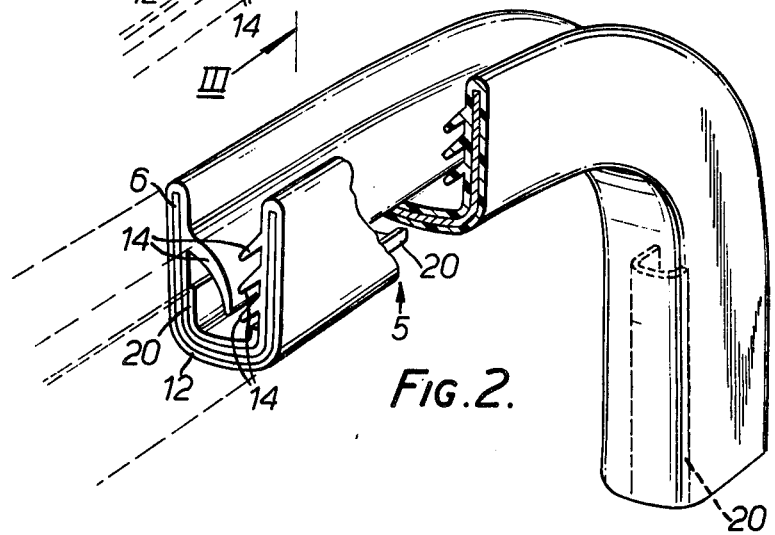
FIG. 2 is a perspective view, partly broken away, showing the construction of the strip near a sharp bend or corner.

As shown in the Figures, the strip is provided with reinforcing members 20, but only along those lengths of the strip which are to be fitted to the intermediate portions of the vehicle door opening. The portions of the strip at the sharp bends or curves (see FIG. 2 where such a sharp bend is illustrated) are not provided with any such reinforcing member 20.

The reinforcing members 20 are made of metal or any suitable material and are of shallow asymmetric channel shape in cross-section. The width across the channel of each reinforcing member is such that it is a relatively tight fit in the inside of the base of the gripping portion 5 so as to enable it to be held therein merely by friction. However, as it is positioned between the base of the channel of the gripping portion and the innermost gripping lips 14, it will additionally be prevented by the lips from falling out.

However, if desired, the reinforcing members may be additionally held in position as by adhesive.

The reinforcing members 20 may be provided with suitable coatings to prevent corrosion.

The reinforcing members 20 are relatively stiff and thus hold relatively stiffly the lengths of the sealing strip intended to be fitted to the intermediate portions of the door opening. However, the members 20 are arranged to be sufficiently pliable to enble them to be bent or curved slightly by the fitter when he is assembling the strip to the vehicle body opening. In this way, he can shape or form the sealing strip to match any slight curves of the intermediate portions of the door opening (in any plane), and the reinforcing members will thereafter retain the sealing strip in that shape.

The fact that the sealing strip is completely free of the reinforcing members 20 at the positions where sharp bends or curves are required enables the fitter to more easily fit the sealing strip into such sharp bends or curves. Furthermore, it has the advantage that the loop or frame can be more easily "folded up" for storage or transport, before fitting to the vehicle body.

If the metal carrier 6 has the form illustrated in the above-mentioned British Patents or above-mentioned British Application, the strip has the advantage that, even though it is provided with the reinforcing members 20, it can still be compressed lengthwise to a slight extent so as to enable its length to be adjusted slightly to take account of tolerances in manufacture.

Although the arrangement is particularly advantageous where the sealing strip is in the from of a closed loop or frame, it is not essential, and it may be applied to the case where this is not so.

It will be appreciated that the arrangement may also be applied where the sealing strip is to be fitted around the opening of a luggage compartment of a vehicle body.

What is claimed is:

1. A channel-shaped trimming or sealing strip which is shaped so that the side walls of the channel-shape embrace a mounting flange for the strip and which is in the form of a channel-shaped flexible metal carrier covered with flexible covering material defining gripping lips running longitudinally along the inside of the channel on the opposite inside walls thereof so as to grip the said flange, the strip being in combination with a separate, relatively straight, reinforcing member which is fitted within the channel and which is stiff but sufficiently long and pliable to enable it to be bent slightly, with the strip, to hold the strip in a slight curve.

2. A strip according to claim 1, in which the reinforcing member is positioned in the base of the channel between the base of the channel and the gripping lips.

3. A strip according to claim 1, in which the reinforcing member is in the form of a shallow channel.

4. A strip according to claim 1, in which the carrier is of a form comprising U-shaped elements arranged side-by-side to define a channel and linked together in a manner which enables the carrier to be compressed lengthwise to a slight extent.

5. A channel-shaped trimming or sealing strip, in the form of a loop which is pre-formed to suit a particular vehicle body opening, comprising channel-shaped flexible material shaped and sized so that the side walls of the channel embrace a mounting flange on which the strip is to be mounted and which extends around so as to define the vehicle body opening, the flexible material defining gripping lips running longitudinally along the inside of the channel on the opposite inside walls thereof so as to grip the mounting flange, a flexible metal carrier which is completely embedded within the said channel-shaped material, a plurality of lengths of reinforcing member respectively positioned within the channel in parts of the length of the strip between the positions where sharp bends or corners are required in the loop, the lengths of reinforcing member being stiff but sufficiently long and pliable to enable them to be bent slightly, with the strip, to hold the said parts of the strip in a slight curve, the strip being completely free of said reinforcing member at each of the sharp bends or corners.

6. A strip according to claim 5, in which each reinforcing member is positioned in the base of the channel between the base of the channel and the gripping lips.

7. A strip according to claim 6, in which each reinforcing member is in the form of a shallow channel.

* * * * *